(12) United States Patent
Grueger et al.

(10) Patent No.: US 10,247,607 B2
(45) Date of Patent: Apr. 2, 2019

(54) OPTICAL ARRANGEMENT FOR A SPECTRAL ANALYSIS SYSTEM, METHOD FOR ITS PRODUCTION, AND SPECTRAL ANALYSIS SYSTEM

(71) Applicant: Fraunhofer-Gesellschaft zur Foerderung der angewandten Forschung e.V., München (DE)

(72) Inventors: Heinrich Grueger, Dresden (DE); Jens Knobbe, Dresden (DE); Tino Puegner, Dresden (DE)

(73) Assignee: Fraunhofer-Gesellschaft zur Föderung der angewandten Forschung e.V., München (DE)

( * ) Notice: Subject to any disclaimer, the term of this patent is extended or adjusted under 35 U.S.C. 154(b) by 17 days.

(21) Appl. No.: 15/714,454

(22) Filed: Sep. 25, 2017

(65) Prior Publication Data
US 2018/0087963 A1    Mar. 29, 2018

(30) Foreign Application Priority Data

Sep. 26, 2016 (DE) .................. 10 2016 118 135

(51) Int. Cl.
*G01J 3/18* (2006.01)
*G01J 3/02* (2006.01)
(Continued)

(52) U.S. Cl.
CPC ............. *G01J 3/1804* (2013.01); *G01J 3/021* (2013.01); *G01J 3/0202* (2013.01);
(Continued)

(58) Field of Classification Search
CPC ...... G01J 3/1804; G01J 3/0202; G01J 3/0208; G01J 3/021; G01J 3/0229; G01J 3/0256; G01J 3/04; G01J 3/06; G01J 2003/1885
(Continued)

(56) References Cited

U.S. PATENT DOCUMENTS 5,497,230 A * 3/1996 Ohkubo .................. G01J 3/28
  356/328
7,126,686 B2  10/2006 Tsujita
(Continued)

FOREIGN PATENT DOCUMENTS

DE    102008019600 A1    10/2009
DE    102010040768 A1    3/2012
(Continued)

OTHER PUBLICATIONS

Puegner, T. et al., "Near-Infrared Grating Spectrometer for Mobile Phone Applications," Applied Spectroscopy 70(5), pp. 734-745, 2016.
(Continued)

*Primary Examiner* — Hina F Ayub
(74) *Attorney, Agent, or Firm* — Slater Matsil, LLP

(57) ABSTRACT

An optical arrangement for a spectral analysis system, a method for producing an optical arrangement for a spectral analysis system and a spectral analysis system are disclosed. In an embodiment the optical arrangement includes a carrier substrate having a placement area for a frame and a base area, and a diffraction grating movably arranged in the frame, wherein the frame is arranged on the placement area in an inclined placement position with respect to the base area so that the diffraction grating, arranged in a base position, is inclined with respect to the base area.

15 Claims, 3 Drawing Sheets

(51) Int. Cl.
*G01J 3/04* (2006.01)
*G01J 3/06* (2006.01)

(52) U.S. Cl.
CPC .......... *G01J 3/0208* (2013.01); *G01J 3/0229* (2013.01); *G01J 3/0256* (2013.01); *G01J 3/04* (2013.01); *G01J 3/06* (2013.01); *G01J 2003/1885* (2013.01)

(58) Field of Classification Search
USPC ....................................................... 356/328
See application file for complete search history.

(56) References Cited

U.S. PATENT DOCUMENTS

| | | | |
|---|---|---|---|
| 8,045,159 B2 | 10/2011 | Egloff et al. | |
| 8,861,060 B2 | 10/2014 | Puegner et al. | |
| 2007/0177141 A1* | 8/2007 | Ohishi | G01J 3/02 356/308 |
| 2017/0108380 A1* | 4/2017 | Zhu | G01J 3/1895 |

FOREIGN PATENT DOCUMENTS

| | | |
|---|---|---|
| EP | 1144965 B1 | 11/2004 |
| WO | 2003069289 A1 | 8/2003 |
| WO | 2003069290 A1 | 8/2003 |

OTHER PUBLICATIONS

Puegner, T. et al., "Basic Angles in Microelectromechanical system scanning grating spectrometers," Appl. Optics, 50(24), Aug. 20, 2011, pp. 4894-4902.

* cited by examiner

US 10,247,607 B2

OPTICAL ARRANGEMENT FOR A SPECTRAL ANALYSIS SYSTEM, METHOD FOR ITS PRODUCTION, AND SPECTRAL ANALYSIS SYSTEM

CROSS-REFERENCE TO RELATED APPLICATIONS

This application claims priority of German Patent Application No. 10 2016 118 135.8, filed Sep. 26, 2016, which application is hereby incorporated by way of back reference.

TECHNICAL FIELD

The application relates to an optical arrangement for a spectral analysis system, in particular, for a miniaturized spectral analysis system for the near infrared (NIR) spectral range, which is suitable for mobile applications, such as e.g. in mobile telephones, owing to its very small dimensions. Furthermore, a method for producing the optical arrangement and the spectral analysis system having the optical arrangement are described.

BACKGROUND

Users of mobile telephones or comparable mobile devices, such as smartphones, tablets or the like, use the device with a multiplicity of functions in all areas of daily life. The range of functions will continue to grow and create new possibilities for future generations of devices. More complex analysis aspects for assessing the quality of food and also in other areas, such as material analysis for detecting counterfeit products, all the way into the areas of fitness and health detection or even telemedicine, are expected to be a very important area.

Laboratory methods for a reliable analysis of organic objects, even including humans as a living system of organic material, are known and have become established. In recent years, a great deal of investment has been put into the miniaturization of the necessary components for mobile use. A highly promising approach is spectral analysis, in particular in the NIR spectral range, i.e. electromagnetic radiation in the wavelength interval from 780 nm to 2500 nm.

Documents WO 2003/069289 A1 and WO 2003/069290 A1 describe spectrometers that use a movable dispersive element, in particular, a rotating diffraction grating. The rotating diffraction grating is part of a monochromator, as a result of which the spectrometer requires only a single detector. The grating and its drive can be in the form of a microelectromechanical system (MEMS).

DE 10 2008 019 600 A1 discloses a MEMS hybrid spectrometer. Further miniaturization is achieved here by integrating a plurality of functional elements in the MEMS component. By way of the photolithography of the process technology, the grating and the slits can consequently be adjusted with a precision that is much more accurate than any manual component adjustment. The spectrometer is furthermore realized as a stack of substrates, with the result that it is possible in principle to build up a large number of systems to form a composite structure, to simplify adjustment, and to then singulate the systems.

A further miniaturized spectral analysis system is known from the document "Near-Infrared Grating Spectrometer for Mobile Phone Applications," Applied Spectroscopy 70(5), 734-745 (2016) by T. Pügner, J. Knobbe, H. Grüger. The principle-based symmetry of the approach, wherein the grating always oscillates with equal amplitude from its rest position into both angular directions, makes it necessary to deviate from the classical approach of a Czerny-Turner spectrometer in the first order of diffraction, since otherwise the same spectral range for positive and negative deflection angles will be scanned twice. This problem has been solved by using the first negative order of diffraction. Here, the W-shaped beam path of a Czerny-Turner spectrometer is folded, and the entrance and exit slit are moved to the same side of the grating. However, use of the folded beam path is also associated with a problem. Instead of the spherical on-axis mirrors that are typical in a Czerny-Turner arrangement, off-axis bi-conic mirrors must be used for an acceptable imaging performance. These are complex to produce and are producible in volume only to a limited extent, or not in a sufficiently cost-effective manner, due to the currently available technologies.

SUMMARY

Embodiments provide an optical arrangement for a spectral analysis system, a method for its production, and a spectral analysis system.

In accordance with at least one embodiment, the optical arrangement for a spectral analysis system comprises a diffraction grating, which is arranged movably in a frame. The optical arrangement furthermore comprises a carrier substrate, on which the frame with the diffraction grating is arranged, wherein the carrier substrate has a placement area, on which the frame is arranged in a placement position which is inclined with respect to a base area of the carrier substrate. The placement area can be an inclined placement surface or any other desired placement structure on which the frame can be arranged in a placement position that is inclined with respect to the base area of the carrier substrate. Instead of a closed placement surface, the placement area can also for example be formed by a plurality of supporting elements, which together form the placement area and thus define the inclined placement position. By arranging the frame on the placement area in the placement position that is inclined with respect to the base area of the carrier structure, the diffraction grating that is arranged in the frame in a base position is inclined with respect to the base area of the carrier substrate.

The base position of the movably arranged diffraction grating can be in particular parallel with respect to the main plane of the frame in which it is arranged. The diffraction grating can be deflected from this base position advantageously by way of driving forces that are generated in particular by a microelectromechanical system. In particular the angle of incidence of radiation on the diffraction grating can be changed in this way, with the result that, for example if the diffraction grating is used as a monochromator, the wavelength of the radiation that is diffracted at a specified angle can be tuned.

Since the placement area for the frame on the carrier substrate defines a placement position that is inclined with respect to a base area of the carrier substrate, it is easily possible in the base position of the diffraction grating to set a defined angle of incidence for the incident radiation with a high degree of accuracy. The placement position of the frame is inclined by an angle other than 0°, preferably by an angle of between 5° and 45°, with respect to a base area of the carrier substrate.

The base area of the carrier substrate can in particular be a mounting area for the optical arrangement. The angle by which the placement position for the frame with the diffraction grating is inclined with respect to the mounting area of the carrier substrate in the optical arrangement described here is advantageously already determined at the production stage of the carrier substrate. The frame with the diffraction grating can thus be very easily brought into an accurately defined angular position relative to the base area of the carrier substrate by way of arrangement on the placement area of the carrier substrate, which significantly simplifies the mounting of the diffraction grating in high volume numbers with microsystem technology methods, in particular quasi-planar "pick and place" methods.

The placement area is in particular configured as a protrusion from the carrier substrate, wherein a diffraction-grating-facing surface of the carrier substrate outside the protrusion is preferably planar and parallel to the base area thereof. The protrusion can in particular be prism-shaped.

In an advantageous configuration of the optical arrangement, the diffraction grating and its frame are integrated in a component substrate which is arranged on the carrier substrate. The frame is advantageously tiltable with respect to a main plane of the component substrate about a first axis. Furthermore, the diffraction grating is tiltable with respect to a main plane of the frame about a second axis. The first and the second axis are preferably collinear or identical.

The component substrate is preferably an SOI substrate (silicon on insulator), which has a silicon carrier layer, a $SiO_2$ layer and a silicon functional layer. Here, the frame and the diffraction grating are preferably formed in the silicon functional layer. In order to render the frame and the diffraction grating tiltable, spring elements, in particular one or more torsion springs or one or more leaf springs, can be configured in the functional layer.

The diffraction grating is advantageously deflectable from the base position by a microelectromechanical drive system. The microelectromechanical drive system can generate the driving forces for example in the form of electromagnetic, electrostatic, thermoelectric, or piezoelectric forces. The microelectromechanical drive system can be integrated in particular in the component substrate.

Furthermore specified is a spectral analysis system having the optical arrangement described above. The term "spectral analysis system" is here understood to mean any optical system with which electromagnetic radiation, in particular light, of adjacent wavelength ranges can be decomposed into its spectral components, observed and/or registered. The spectral analysis system preferably comprises a mirror arrangement which is provided to reflect, during operation of the spectral analysis system, incident radiation onto the diffraction grating and to reflect radiation that was diffracted at the diffraction grating toward a light exit opening and/or to a radiation detector. The spectral analysis system is in particular set up to detect electromagnetic radiation in dependence on the wavelength, wherein the detectable wavelength range is preferably in the NIR spectral range, in particular in the range of 780 nm to 2500 nm. The spectral analysis system can alternatively also be provided for different wavelength ranges, for example for the visible spectral range (approximately 400 nm to 700 nm) or the MIR spectral range (approximately 2500 nm to 6000 nm).

The spectral analysis system in accordance with a preferred configuration is a Czerny-Turner spectrometer, Fastie-Ebert spectrometer or a Littrow spectrometer, in particular an unfolded Czerny-Turner spectrometer (referred to as a W arrangement). Arranged in the spectral apparatus are advantageously a light entrance slit and/or a light source on one side of the grating, and a light exit slit and/or a detector on a different side of the grating. The light source can be arranged in particular upstream of a light entrance slit, and the detector downstream of the light exit slit. The arrangement of the frame and of the diffraction grating in the inclined placement position on the placement area of the carrier substrate advantageously permits the production of such an unfolded Czerny-Turner spectrometer by way of microsystem technology methods. The embodiment of the spectral analysis system as a Czerny-Turner spectrometer with an unfolded beam path has the advantage in particular that a sufficient imaging performance can be achieved with a mirror arrangement having two spherical mirrors, in particular two spherical on-axis mirrors. The production complexity is hereby reduced as compared to the spectrometer having a folded beam path as described in the introductory part, in which bi-conic off-axis mirrors are used to achieve an acceptable imaging performance, and cost-effective high-volume production is thus made possible. To further increase the resolution, it is also possible to use aspherical mirrors.

In one configuration, at least one radiation source and/or at least one radiation detector can be integrated in the spectral analysis system.

It is also possible for light to enter the spectral analysis system through a light entrance slit, wherein the light entrance slit is advantageously formed in the carrier substrate and/or component substrate. It is furthermore possible for the light that is diffracted at the diffraction grating to leave the spectral analysis system, after reflection at a mirror of the mirror arrangement, through a light exit opening in the carrier substrate and/or the component substrate of the optical arrangement and to then be incident on a radiation detector outside the optical arrangement.

The spectral analysis system is preferably a miniature spectral analysis system. The volume of the spectral analysis system is preferably not more than 8 $cm^3$, with particular preference less than 2 $cm^3$.

The spectral analysis system preferably has a width of no more than 15 mm, a length of no more than 15 mm, and a height of no more than 6 mm. The length and width are measured here in the main plane of the carrier substrate, and the height is measured perpendicular to the carrier substrate.

In a method for producing the optical arrangement for the spectral analysis system, a carrier substrate is produced which has a placement area for the frame, wherein the placement area is configured such that it defines a placement position for the frame that is inclined with respect to a base area of the carrier substrate. The placement area can be a placement surface or a placement structure that is configured in another way, for example a placement structure that is formed by discrete placement elements. The placement area is formed in particular at a protrusion in the carrier substrate. The protrusion preferably protrudes from the otherwise planar surface of the carrier substrate. The protrusion can for example be a prism-shaped structure that protrudes from the carrier substrate. The carrier substrate preferably has an electrically insulating material, in particular a ceramic or a composite material such as, for example, FR4.

In a further step of the method, a component substrate is produced which has a diffraction grating that is arranged to be movable in a frame. The diffraction grating can be in particular rotatably attached to spring elements, for example torsion springs. The component substrate can in particular be an SOI substrate, wherein the frame and the diffraction grating are formed in a functional layer of the component substrate. The diffraction grating can in particular be structured into a silicon functional layer of the component substrate.

Furthermore a drive for the grating is preferably integrated in the component substrate. The drive can be produced in particular in MEMS technology. The diffraction grating with its frame and the drive can be attached to one or more spring elements, for example leaf springs or torsion springs. The spring elements are preferably likewise formed in the functional layer of the component substrate.

In a further method step, the component substrate and the carrier substrate are assembled. Micro-assembly methods that are known per se can be used for the assembly. During assembly, the frame with the diffraction grating is arranged on the placement area of the carrier substrate and is thus brought into the placement position that is defined by the placement area. The diffraction grating that is in the frame is thus brought into a base position that is inclined with respect to the base area of the carrier substrate. In this way, a defined angle is set between the plane of the diffraction grating in the base position and the base area of the carrier substrate, which angle was already defined during production of the carrier substrate by the inclination of the placement position. For this reason, no complicated adjustment of the diffraction grating is necessary, and instead, the defined angle is set merely by arrangement on the carrier substrate.

The component substrate and the carrier substrate can advantageously be assembled using an automated mounting method ("pick and place"), as a result of which cost-effective high-volume production of the optical arrangement is advantageously made possible. Here, the mounting can be performed in quasi-planar fashion, i.e. without the tilting of components during the mounting process. This offers a tremendous time and cost advantage, because customary pick-and-place tools can stack components one on top of the other with high accuracy only in planar fashion. With an appropriate configuration, it is also possible to ensure that subsequent mounting steps for the entire system can be performed in planar fashion in stacks. In this way, the diffraction grating in the base position is given an inclined orientation within a system which is made of otherwise quasi-planar components.

When assembling the carrier substrate and the component substrate, they are advantageously connected fixedly with one another. In particular, the carrier substrate and the component substrate can be fixedly connected to one another by way of an adhesive, for example an epoxy resin.

BRIEF DESCRIPTION OF THE DRAWINGS

The invention will be explained in more detail below with reference to exemplary embodiments in connection with FIGS. 1 to 5.

DETAILED DESCRIPTION OF ILLUSTRATIVE EMBODIMENTS

Identical or identically acting constituent parts are in each case provided with the same reference signs in the figures. The illustrated constituent parts and the aspect ratios of the constituent parts relative to one another should not be considered as being true to scale.

Figure 1:
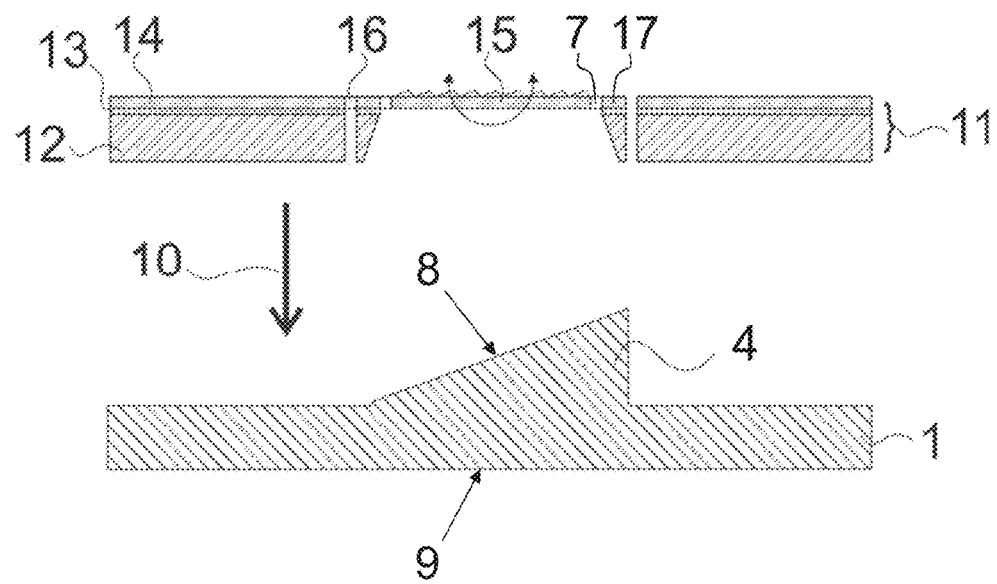
FIG. 1 shows a schematic illustration of an intermediate step in the method for producing the optical arrangement.

FIG. 1 illustrates an intermediate step in an exemplary embodiment of the method for producing the optical arrangement, in which a component substrate 11 is applied in a direction 10 onto a carrier substrate 1.

The carrier substrate 1 and the component substrate 11 are produced separately before the assembly. The carrier substrate 1 can in particular include a ceramic or a composite material, for example FR4. The carrier substrate 1 has an electrically insulating base material, wherein electrical conductor paths for integrating electric components can be integrated in the carrier substrate 1. The carrier substrate has a protrusion 4, which in the exemplary embodiment is formed in the shape of a prism. Formed at the protrusion 4 is a placement area 8, which is inclined with respect to a base area 9 of the carrier substrate 1. The placement area 8 in the example shown here is a planar placement surface. However, the placement area 8 could alternatively also be implemented by way of a placement structure, by way of which an inclined placement position is defined, for example an arrangement having one or more support elements. Outside the protrusion 4, the carrier substrate 1 preferably has a planar surface, which is parallel with respect to the base area 9 of the carrier substrate 1. The protrusion 4 can be formed in particular centrally in the carrier substrate 1 and be surrounded on both sides by planar regions.

Formed in the component substrate 11, which is produced separately from the carrier substrate 1, are a diffraction grating 15 and a frame 17, wherein the diffraction grating 15 is arranged to be movable in the frame 17. The component substrate 11 can be produced by micro technology methods which are known per se, in particular as a silicon MEMS component. The component substrate 11 is preferably an SOI substrate. The SOI substrate contains a carrier layer 12 which includes silicon, an intermediate layer 13 which includes $SiO_2$, and a functional layer 14 which includes silicon.

The diffraction grating 15 and its frame 17 are provided in particular in the functional layer 14 of the component substrate 11. The diffraction grating 15 can be for example a sinusoidal or a trapezoidal diffraction grating. The diffraction grating 15 is rotatably attached in the frame 17 by way of torsion springs 7. The frame 17 is configured to be movable with respect to the rest of the component substrate 11. By way of example, the frame 17 is connected, via one or more leaf springs 16, to regions of the functional layer 14 that are located outside the frame 17. The frame 17 is thus rotatable about an axis which, in FIG. 1, extends perpendicular to the drawing plane. The axes about which the diffraction grating 15 and the frame 17 are rotatably mounted extend in particular parallel with respect to one another and are preferably collinear or identical.

When assembling the component substrate 11 and the carrier substrate 1 along the direction 10, which extends in particular perpendicular to the component substrate 11 and the carrier substrate 1, the diffraction grating 15 with the frame 17 is arranged on the placement area 8 of the carrier substrate 1. The dimensions of the placement area 8 therefore advantageously substantially coincide with the dimensions of the frame 17 and the diffraction grating 15 therein. When assembling the component substrate 11 and the carrier substrate 1, the frame 17, in which the diffraction grating 15 is arranged and which is arranged movably with respect to the remaining component substrate 11, is tilted about the angle that corresponds to the inclination of the placement area 8 with respect to the base area 9. The frame 17 with the diffraction grating 15 is thus brought into an accurately defined angular position with respect to the base area 9 of the carrier substrate 11, without the need for an active rotational movement due to a force being exerted from the outside. In particular, the component substrate 11 is moved in a simple manner only in the perpendicular direction 10. This perpendicular movement in the direction 10 can be realized simply by way of conventional micro-assembly methods and is suitable in particular for automated mounting methods. The optical arrangement can in this way be cost-effectively produced in volume.

The production method of the optical arrangement described here is advantageous in particular even if a multiplicity of optical arrangements which are generally of identical type and differ in terms of the inclination angle of the diffraction grating 15 in the base position is intended to be produced. In this case, it is possible to use component substrates 11 of identical construction, which are applied to different carrier substrates 1, for the optical arrangements, wherein the carrier substrates 1 differ from one another by way of the inclination angles of the placement area 8. The carrier substrate 1 of comparatively simple construction, which in particular does not contain any movable parts, can be modified relatively simply to produce different inclination angles of the placement area 8. However, the design of the component substrate 11, which is produced with more difficulty as compared to the carrier substrate 1, advantageously does not need to be modified for variants of the optical arrangement with different inclination angles.

During the assembly, the component substrate 11 and the carrier substrate 1 are advantageously fixedly connected to one another, for example using an adhesive layer that is applied before the assembly. The adhesive layer can include, for example, an epoxy resin.

Figure 2:
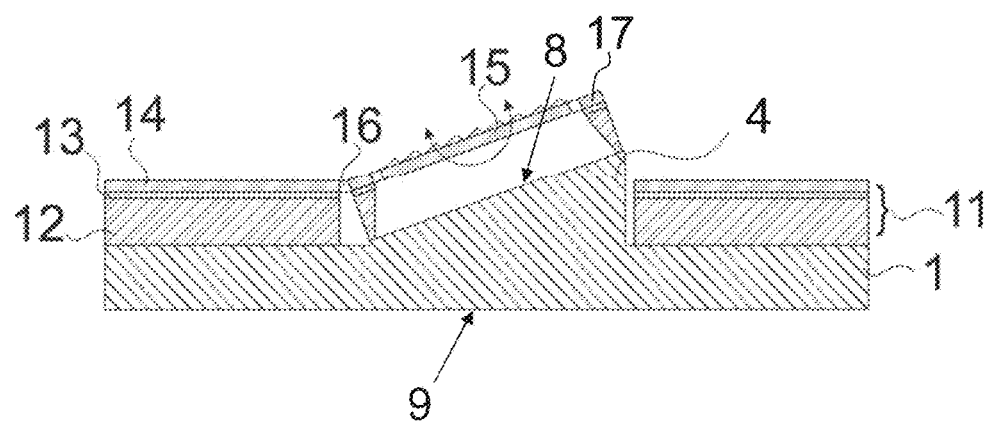
FIG. 2 shows a schematic illustration of a cross section through an exemplary embodiment of the optical arrangement.

FIG. 2 shows an exemplary embodiment of the optical arrangement after the assembly of the component substrate 11 and the carrier substrate 1, wherein the optical functional element that includes the frame 17 with the diffraction grating 15 is arranged on the placement area 8. By inclining the placement position of the frame 17, which is defined by the placement area 8, a base position of the diffraction grating 15 in the optical arrangement is defined, wherein the diffraction grating 15 in the base position is aligned in particular parallel with respect to the plane of the frame 17. The diffraction grating 15 is advantageously deflectable from this base position by way of a rotational movement, as is indicated in FIG. 2 by way of arrows. In the finished spectral analysis system, in particular the wavelength of the radiation that is diffracted in a specified direction is tunable by means of this rotational movement. The diffraction grating 15 can in particular be provided as part of a monochromator in a spectral analysis system. The previous deflection of the diffraction grating 15 in the base position is particularly advantageous for addressing a reasonable free spectral range.

For performing the rotation movement, advantageously a drive is integrated in the optical arrangement. Such a drive can be integrated as a MEMS system in the component substrate 11 (not illustrated). The drive can be, for example, an electrostatic drive, in particular an electrostatic comb drive. The configuration of the drive can be, for example, resonant or quasi-static.

In the optical arrangement described here, a drive for the diffraction grating in the component substrate 11 advantageously is simply contactable electrically. Such contacting is generally performed by way of wire bonding, wherein, for example, electrically conducting connections are produced between electrical terminals on the carrier substrate 1 and the component substrate 11. To this end, the two involved components, i.e. the component substrate 11 and the carrier substrate 1 must, for technical reasons, be aligned as parallel as possible. The arrangement of carrier substrate 1 and component substrate 11 described here permits the guiding of electrical conducting paths from the drive in the component substrate 11, via the flexible spring 16, onto the portion of the component substrate 11 that extends parallel to the carrier substrate 1. Here, bond pads can be provided, with which a bond connection for example with the carrier substrate 1 can be produced.

Figure 3:
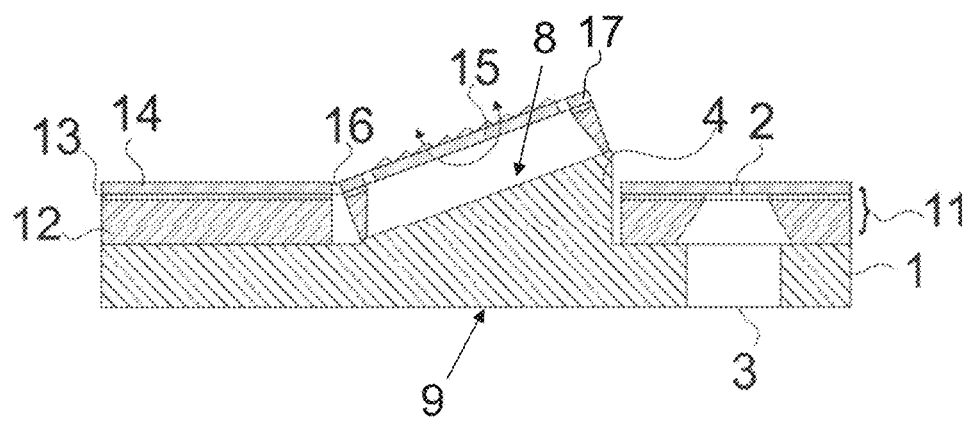
FIG. 3 shows a schematic illustration of a cross section through a further exemplary embodiment of the optical arrangement.

The further exemplary embodiment of the optical arrangement illustrated in FIG. 3 differs from the exemplary embodiment in FIG. 2 by way of an opening 3 being integrated in the carrier substrate 1 and the component substrate 11. The dimensions of the opening 3 can be selected such that an optical fiber, in particular having a ferrule for coupling in light, can be mounted from the rear of the base area 9 of the carrier substrate 1. Furthermore integrated in the functional layer 14 of the component substrate 11 is a slit 2, which adjoins the opening 3. A defined light entrance opening is formed by the slit 2. The slit 2 can be used as an entrance slit for electromagnetic radiation in a spectral analysis system, of which the optical arrangement is a constituent part. This has the advantage that the position of the slit 2 and of the diffraction grating 15 is highly accurately specified in terms of production, in particular by lithographic production, and is reproducible. In addition, the slit 2 and the diffraction grating 15 are located in one plane before mounting. It is then possible for an axis of symmetry to be located in the spectral analysis system perpendicular to this plane. As a result, accurate alignment of the slit 2 with this plane of symmetry can be dispensed with when mounting the entire spectral analysis system.

Figure 4:
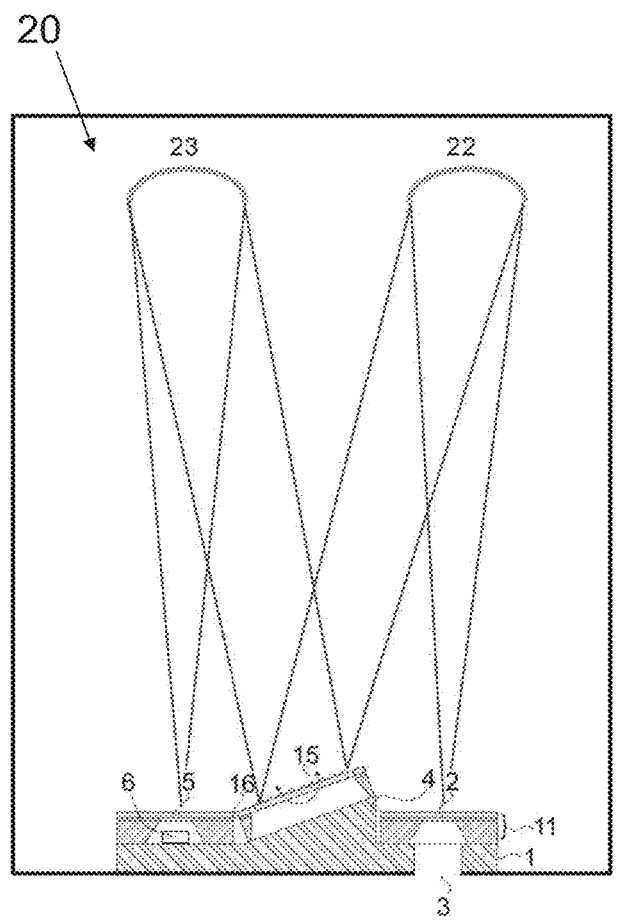
FIG. 4 shows a schematic illustration of a cross section through an exemplary embodiment of a spectral analysis system with the optical arrangement.

FIG. 4 illustrates a spectral analysis system 20, which has the above-described optical arrangement. The spectral analysis system 20 has, in addition to the optical arrangement, a mirror arrangement 22, 23, which in the exemplary embodiment is advantageously formed by two spherical mirrors. The spectral analysis system 20 can in particular be configured as a Czerny-Turner spectrometer. In particular, a first spherical mirror can be provided to reflect radiation, which enters the spectral analysis system 20 through the slit 2, toward the diffraction grating 15. The second spherical mirror 23 can furthermore be provided for reflecting the diffracted radiation toward a further slit 5, which is arranged for example upstream of a radiation detector 6.

The spectral analysis system 20 can have a volume of less than 2 cm$^3$. In particular it is possible for the external dimensions to be no more than 16×12×6 mm$^3$. The cost-effective production and mounting of such a small spectral analysis system 20 is significantly simplified in particular by the above-described configuration of the optical arrangement, which can be assembled using a planar micro-assembly method (pick and place).

Figure 5:
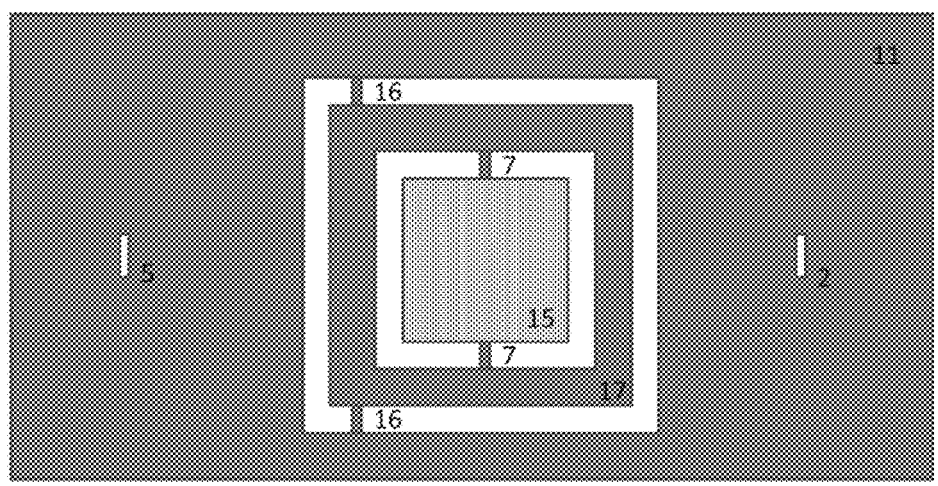
FIG. 5 shows a plan view of the optical arrangement in the exemplary embodiment of the spectral analysis system in accordance with FIG. 4.

FIG. 5 illustrates a plan view of the optical element in the spectral analysis system 20 of FIG. 4. What can be seen in the plan view are the light entrance slit 2 and the light exit slit 5, which are formed in the functional layer of the component substrate 11. The plan view furthermore shows the diffraction grating 15, which is mounted rotatably in the frame 17 by way of torsion springs 7. The frame 17 in turn is mounted rotatably with respect to the remainder of the functional layer of the component substrate 11, for example by way of one or more spring elements 16, in particular torsion springs.

It is possible for the optical arrangement to include an apparatus with which the position of the frame 17 and/or of the diffraction grating 15 relative to the carrier substrate can be detected.

The invention is not limited by the description by way of the exemplary embodiments. Instead, the invention comprises every new feature and every combination of features, including in particular every combination of features in the patent claims, even if this feature or this combination itself has not been explicitly stated in the patent claims or the exemplary embodiments.

What is claimed is:

1. An optical arrangement for a spectral analysis system comprising:
   a carrier substrate comprising:
      a placement area for a frame; and
      a base area; and
   a diffraction grating movably arranged in the frame, wherein the frame is arranged on the placement area in an inclined placement position with respect to the base area so that the diffraction grating, arranged in a base position, is inclined with respect to the base area.

2. The optical arrangement according to claim 1, wherein the placement area comprises a protrusion in the carrier substrate, and wherein a diffraction-grating-facing surface of the carrier substrate outside the protrusion is planar and parallel with respect to the base area.

3. The optical arrangement according to claim 2, wherein the protrusion is prism-shaped.

4. The optical arrangement according to claim 1, wherein the diffraction grating and the frame are integrated in a component substrate that is arranged on the carrier substrate.

5. The optical arrangement according to claim 4, wherein the frame is tiltable with respect to a main plane of the component substrate about a first axis.

6. The optical arrangement according to claim 5, wherein the diffraction grating is tiltable with respect to a main plane of the frame about a second axis.

7. The optical arrangement according to claim 6, wherein the first and the second axis are collinear or identical.

8. The optical arrangement according to claim 4, wherein the component substrate is an SOI substrate that includes a silicon carrier layer, a $SiO_2$ layer and a silicon functional layer, and wherein the frame and the diffraction grating are configured in the silicon functional layer.

9. The optical arrangement according to claim 1, wherein the diffraction grating is deflectable from the base position by way of a drive system.

10. A spectral analysis system comprising:
    an optical arrangement according to claim 1; and
    a mirror arrangement for reflecting incident radiation onto the diffraction grating and for reflecting diffracted radiation toward a light exit opening and/or a radiation detector.

11. The spectral analysis system according to claim 10, wherein the spectral analysis system is a Czerny-Turner spectrometer, and wherein the mirror arrangement has two spherical mirrors.

12. The spectral analysis system according to claim 10, wherein the radiation detector and/or a radiation source are integrated in the optical arrangement.

13. The spectral analysis system according to claim 10, wherein the spectral analysis system is a miniaturized spectral analysis system, and wherein a volume of which is not more than 8 $cm^3$.

14. A method for producing an optical arrangement for a spectral analysis system, the method comprising:
    producing a component substrate having a diffraction grating that is arranged movably in a frame,
    producing a carrier substrate having a base area and a placement area for the frame, wherein the placement area is configured such that it defines a placement position for the frame that is inclined with respect to the base area; and
    assembling the component substrate and the carrier substrate so that the frame is arranged on the placement area in a placement position that is inclined with respect to the base area and so that the diffraction grating is in a base position that is inclined with respect to the base area of the carrier substrate.

15. The method according to claim 14, wherein the component substrate is connected fixedly to the carrier substrate.

* * * * *

UNITED STATES PATENT AND TRADEMARK OFFICE
CERTIFICATE OF CORRECTION

PATENT NO. : 10,247,607 B2
APPLICATION NO. : 15/714454
DATED : April 2, 2019
INVENTOR(S) : Grueger It is certified that error appears in the above-identified patent and that said Letters Patent is hereby corrected as shown below:

On the Title Page

Item (73) Assignee, Line 1, delete "Föderung" and insert --Förderung--.

Signed and Sealed this
Ninth Day of July, 2019

Andrei Iancu
*Director of the United States Patent and Trademark Office*